M. A. MOORE.
FILTER.
APPLICATION FILED SEPT. 16, 1911.
1,028,054.
Patented May 28, 1912.
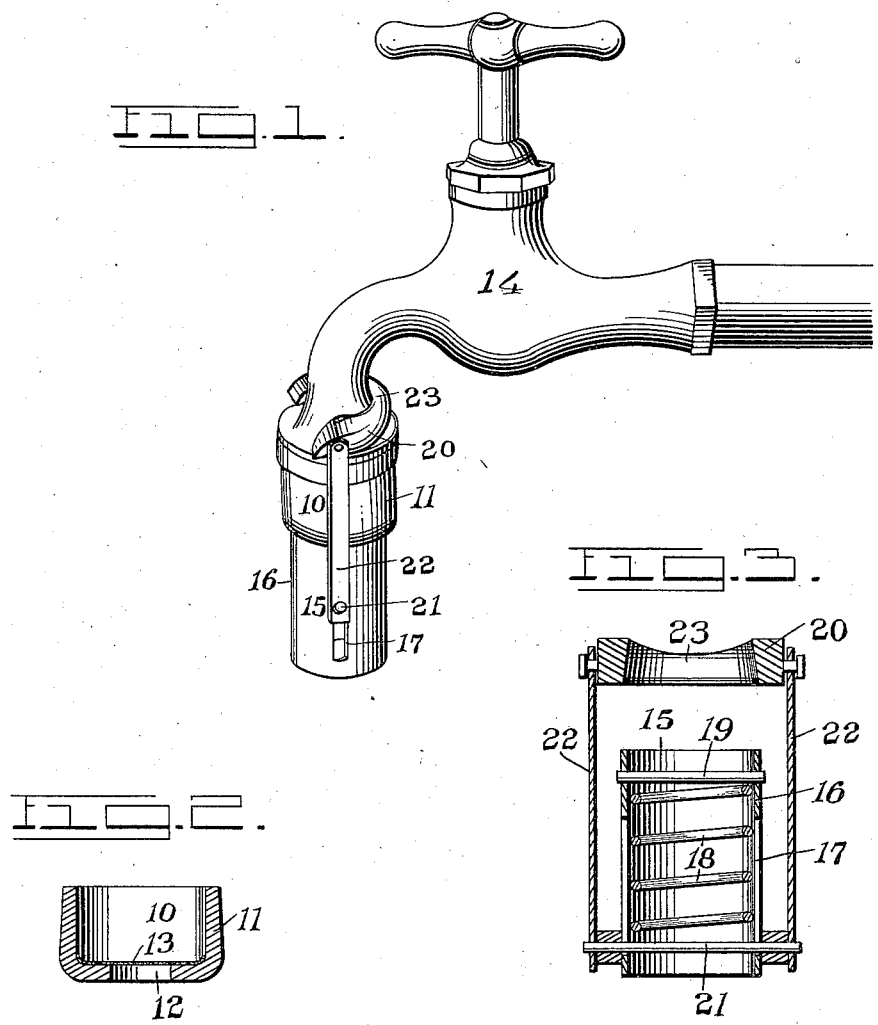
Inventor
Mandeville A. Moore
By Victor J. Evans
Attorney
Witnesses

UNITED STATES PATENT OFFICE.

MANDEVILLE A. MOORE, OF NEWTON HIGHLANDS, MASSACHUSETTS.

FILTER.

1,028,054.     Specification of Letters Patent.     Patented May 28, 1912.

Application filed September 16, 1911. Serial No. 649,684.

*To all whom it may concern:*

Be it known that I, MANDEVILLE A. MOORE, a citizen of the United States, residing at Newton Highlands, in the county of Middlesex and State of Massachusetts, have invented new and useful Improvements in Filters, of which the following is a specification.

The invention relates to filters and has for an object to provide a device for filtering liquids, the filter being particularly adapted for connection with faucets to filter water ejected therefrom. For the purpose mentioned, use is made of a filter body for connection with a faucet to inclose the opening thereof and a retaining member for retaining the filter in rigid engagement with the faucet, the retaining member and filter body being removable from the faucet for the purpose of cleaning the same or replacing various parts thereof.

Reference is to be had to the accompanying drawings constituting a part of this specification, in which similar characters of reference denote corresponding parts in all the views, and in which—

Figure 1 is a perspective view showing my device applied to a faucet. Fig. 2 is a vertical sectional view of the filter body. Fig. 3 is a vertical sectional view of the retaining member.

Referring more particularly to the views, I provide a filter body 10 consisting of a casing 11 having an opening 12 therein, a filtering screen 13 being disposed in the casing 11 to extend across the inner end of the opening 12, the filter body 10 being adapted to be engaged with the end of a faucet 14 as shown in Fig. 1.

A retaining member 15 is provided for retaining the filter body 10 in engagement with the faucet 14 and the retaining member consists substantially of a cylindrical casing 16 having longitudinally extending slots 17, a helical spring 18 being positioned to extend longitudinally in the casing and engage the inner periphery thereof, the upper end of the spring being adapted to abut against a cross bar 19 rigidly secured in the casing 16 and extending transversely thereto. The retaining member 15 further embodies a hanger 20, the said hanger consisting of a bar 21 extended transversely in the casing 16 with the ends thereof projecting through the slot 17, the lower end of the helical spring 18 being arranged to abut against the said bar so that when the same is operated in the slots 17, the spring 18 will be compressed as will be readily understood. Pivotally mounted on the ends of the bar 21 are rods 22 having an inverted U-shaped clamp 23 pivotally connected to the upper ends thereof, the U-shaped clamp being mounted between the rods 22 as shown in Fig. 3.

In the application of my device to the faucet 14, the filter body 10 is first arranged to inclose the opening of the faucet and the upper end of the casing 16 is then placed against the lower end of the filter body 10, after which the clamp 23 is passed over the spout end of the faucet to retain the filter body in rigid position on the faucet, it being understood that when the clamp 23 is positioned as mentioned, the bar 21 will slide in the slots 17 and compress the spring 19 so that the expansible force of the spring will rigidly retain the casing 16 in engagement with the filter body 10. By simply disengaging the clamp 23 from the faucet 14, the retaining member 15 can be entirely removed from engagement with the faucet and the filter body and the filter body can then be easily removed from engagement with the faucet.

When my device is arranged as shown in Fig. 1 and the faucet is operated so that water will be ejected therefrom, the water will pass through the screen 13 in the filter body 10 and any sediment or other foreign matter in the water will be prevented from passing through the screen inasmuch as the screen is preferably woven with a close mesh.

Having thus fully described the invention, what I claim as new, is:—

1. A filter holder comprising a cylindrical casing for engagement with the filter, a spring mounted within the said casing, a bar mounted to slide in slots in the said casing and adapted to operate against the action of the said spring, rods pivotally mounted on the said bar and a clamp having connection with the said rods and adapted for engagement with the stationary member to retain the said filter in engagement therewith.

2. A filter holder comprising a cylindrical casing for engagement with a filter body, an expansible spring mounted within the said casing and a hanger mounted to turn and to slide on the said casing and adapted to
5 operate against the expansible action of the said spring to retain the said casing in engagement with the said filter.

In testimony whereof I affix my signature in presence of two witnesses.

MANDEVILLE A. MOORE.

Witnesses:
J. T. WATERHOUSE,
FLOYD C. REEVES.

Copies of this patent may be obtained for five cents each, by addressing the "Commissioner of Patents, Washington, D. C."